Feb. 19, 1929.
L. M. SLOCUM
1,702,708
AUTOMATIC PLOW RELEASING HITCH
Original Filed Aug. 12, 1925
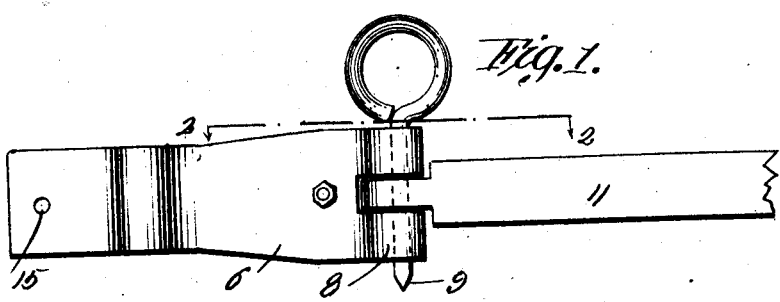
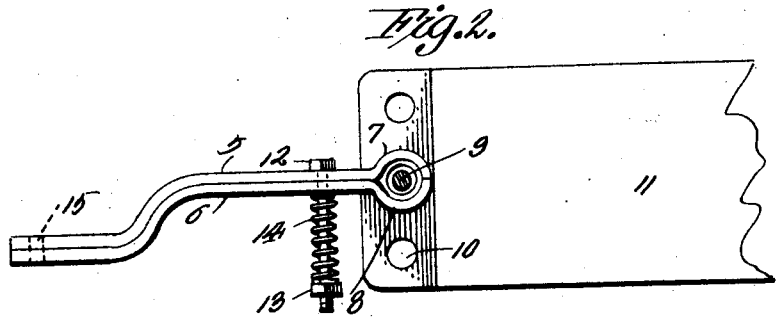
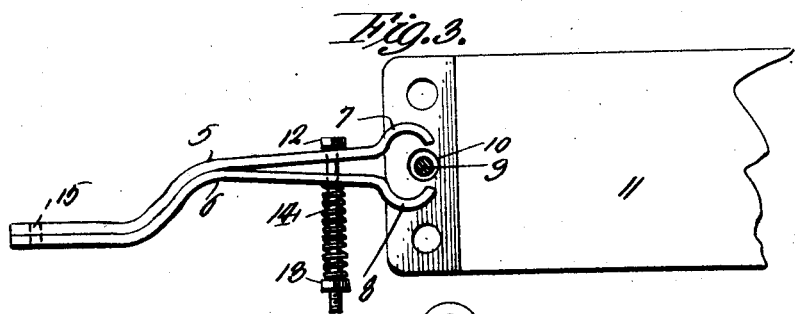
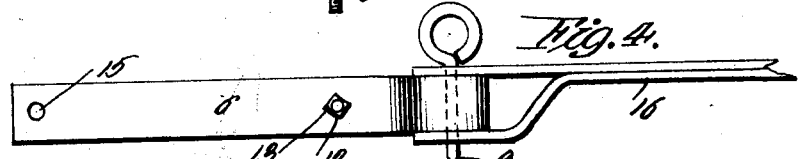
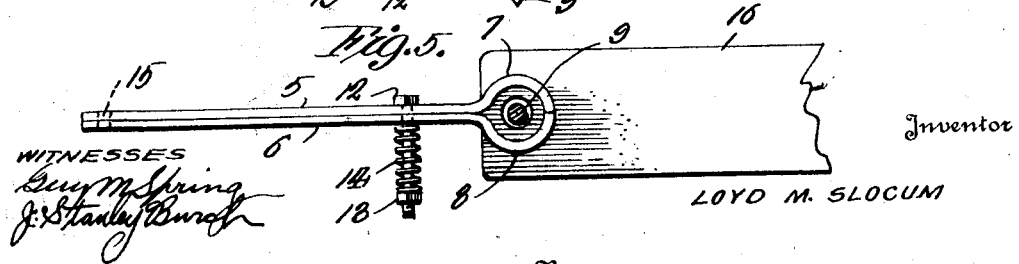
Inventor
LOYD M. SLOCUM Patented Feb. 19, 1929.

1,702,708

UNITED STATES PATENT OFFICE.

LOYD M. SLOCUM, OF WARSAW, NEW YORK.

AUTOMATIC PLOW-RELEASING HITCH.

Application filed August 12, 1925, Serial No. 49,789. Renewed May 29, 1928.

This invention relates to automatic plow releasing hitches, and has more particular reference to a hitching device for connecting the draw bar of a tractor to the beam of a plow and adapted to automatically release the plow from the tractor in case the plow encounters a relatively immovable object while in operation, whereby damage to the plow and other parts is prevented.

Devices have been employed for connecting a plow to the draw bar of a tractor and embodying fragile pins and the like calculated to be broken when the plow strikes a relatively immovable object for releasing the plow. These devices have been more or less unsatisfactory in practical use because of the fact that the fragile elements or pins gradually become weakened after constant use and must be repeatedly renewed at a consequent great loss of time.

The object of the present invention is to provide a plow releasing hitch of the above kind which is simple and durable in construction as well as efficient in operation, and which is so constructed as to eliminate the necessity of using fragile elements or pins of the above mentioned undesirable character.

A further object of the invention is to provide a plow releasing hitch of the above kind which may be readily adjusted for preventing release of the plow until the desired strain has been placed thereon, thus enabling accommodation of the hitch to plows working in soil having different characteristics.

A further object is to provide a plow releasing hitch of the above kind embodying cooperating spring pressed jaws for engaging the draw bar pin of a tractor and adapted to be forcibly separated when a predetermined resistance is placed against the forward traveling movement of the plow, means being provided for adjustably tensioning the jaws so that the predetermined strain necessary for releasing the plow may be varied to suit conditions.

Other objects will appear as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views, Figure 1 is a fragmentary side elevational view showing a plow releasing hitch constructed in accordance with the present invention and operatively associated with an end of a draw bar, Figure 2 is a view partly in horizontal section and taken substantially upon line 2—2 of Figure 1, Figure 3 is a view similar to Figure 2 showing the hitch in the act of releasing, Figure 4 is a view similar to Figure 1 illustrating a modification of the invention, and Figure 5 is a view similar to Figure 2 of the form of the invention shown in Figure 4.

Referring more in detail to the drawing, the present invention comprises a pair of similar elongated plates 5 and 6 which are disposed in side by side relation and freely movable toward and away from each other in a lateral direction. These plates are provided at one end of the hitch with opposed cooperating jaws 7 and 8 preferably of outwardly curved semi-circular form as shown and adapted to releasably engage the shank of the usual draw bar pin 9 when the latter is inserted through the desired one of the openings 10 in the rear end of the draw bar 11 of the tractor. In some instances the jaws 7 and 8 are bifurcated to form the same into upper and lower jaw portions between which the reduced rear end of the draw bar 11 is disposed as shown clearly in Figure 1. Extending through the forward ends of the plates 5 and 6 adjacent the jaws 7 and 8 is a relatively long transverse bolt 12 having a nut 13 adjustably threaded upon the shank thereof, and disposed upon the shank of the bolt 12 between the nut 13 and the adjacent plate 6 is a helical compression spring 14 of relatively great strength. The bolt 12 is freely movable through the plate 6, and it will thus be seen that the spring 14 normally urges the plate 6 towards the plate 5 so that said plates are normally yieldingly held in contiguous relation as illustrated in Figure 2 with the jaws 7 and 8 brought together and completely embracing the pin 9 so that upon forward traveling movement of the tractor, not shown, a plow attached to the end of the hitching device which is not provided with jaws, will be caused to travel along with the tractor. The ends of the plates 5 and 6 not provided with jaws are formed with aligned openings as indicated at 15 for facilitating connection of this end of the device to the forward end of a plow beam through the use of a clevis or other similar appliance. Under some conditions it is desirable to form the plates 5 and 6 with laterally directed intermediate portions so that the ends of the hitching device are in different longitudinal planes as clearly illustrated with respect to the form of the invention in Figures 1 to 3 inclusive.

The form of the invention shown in Figures 4 and 5 is substantially the same as that above described in connection with Figures 1 to 3 inclusive except that the plates are not provided with offset ends and are therefore of straight flat form. This form of the invention shown in Figures 4 and 5 is also shown in connection with a conventional form of draw bar commonly employed with certain forms of plows and indicated at 16, which draw bar embodies a pair of strips with separated ends apertured for reception of the draw bar pin 9.

In operation, the ends of the plates 5 and 6 which are apertured as at 15, are suitably connected to the forward end of a plow beam, and the jaws 7 and 8 are engaged with the draw bar pin 9. The nut 13 is then turned or threaded onto the bolt 12 so as to place the spring 14 under the desired compression whereby the plates 5 and 6 will not separate unless a strain of predetermined strength is placed upon the plates by resistance to the forward traveling movement of the plow. However, should the plow strike a relatively immovable object such as a firmly embedded rock or the stump of a tree, the pin 9 will force its way from between the jaws 7 and 8 by separating the latter against the action of the spring 14 as illustrated in Figure 3 so that the plow is released from the tractor for preventing damage to the plow and other parts. The illustration in Figure 3 is exaggerated for sake of clearness by showing the jaws 7 and 8 spread apart a distance somewhat greater than the diameter of the pin 9, although in practical operation these jaws would simply separate sufficiently to permit the pin 9 to pass therebetween. It is apparent that the jaws may be readily manually separated for permitting their engagement with the pin when placing the hitching device in use, and it is also apparent that should the spring 14 lose some of its strength or compression after continued use, the nut 13 may be adjusted to accommodate for the same. This adjustment can be made quickly and easily and therefore has considerable advantage over the use of fragile pins whose renewal is expensive and time consuming.

It is believed that the construction and operation as well as the advantages of the present invention will be readily understood and appreciated by those skilled in the art.

Minor changes may be made without departing from the spirit and scope of the invention as claimed.

What I claim as new is:

An automatic plow releasing hitch comprising a pair of elongated unconnected plates, normally disposed in side-by-side relation and adapted to be laterally relatively movable, each of said plates having one end formed to set up a substantially semi-circular draw member and further having a longitudinal recess formed transversely of the semi-circular portion, said draw members when said plates are arranged in side-by-side relation, being in opposed relation to set up a sleeve for the reception of a draw bar pin, said recesses providing means to extend a draw bar into the sleeve, a bolt passing freely transversely through the plates and having a nut adjustable thereon, and a compression spring on said bolt between one of the plates and said nut to force the plates and their jaws together.

In testimony whereof I affix my signature.

LOYD M. SLOCUM.